United States Patent [19]

Burns et al.

[11] Patent Number: 4,700,963
[45] Date of Patent: Oct. 20, 1987

[54] VARIABLE ANGLE STEERING SYSTEM

[76] Inventors: Steve Burns, 20846 Lamm Rd., Elmendorf, Tex. 78112; Thomas M. Hutchison, 1940 Riverside Dr., Trenton, Mich. 48183; Henry H. Dertian, 3843 Sheryl Dr., Milan, Mich. 48160

[21] Appl. No.: 888,852

[22] Filed: Jul. 21, 1986

[51] Int. Cl.$^4$ ............................................. B62K 21/02
[52] U.S. Cl. ..................................... 280/276; 180/219
[58] Field of Search .............. 280/279, 270, 271, 272, 280/274, 275, 276; 180/219

[56] References Cited

U.S. PATENT DOCUMENTS 4,565,384 1/1986 Dehnisch ............................ 280/279
4,624,470 11/1986 Love .................................... 280/279

Primary Examiner—John A. Pekar
Attorney, Agent, or Firm—Jack V. Musgrove

[57] ABSTRACT

A steering system is disclosed for providing a continuous change in the pitch angle of the front fork of a motorcycle or similar vehicle as the handlebars are turned. A shaft is coupled to the front fork. An actuator assembly connected to the handlebars of the motorcycle causes the pitch angle of the shaft to change, by means of a fixed pivot assembly. The interaction between the actuator assembly and the pivot assembly comprises a cam bearing fixed to the pivot assembly, and a cam bearing slot which is part of the actuator assembly. When the handlebars are turned, the movement of the actuator assembly is defined by the position of the cam bearing slot relative to the shaft. The shaft is attached to the actuator assembly, and as its pitch angle increases or decreases, the pitch angle of the front fork increases or decreases.

19 Claims, 5 Drawing Figures

VARIABLE ANGLE STEERING SYSTEM

BACKGROUND OF THE INVENTION

1. Field of the Invention

The present invention relates to steering mechanisms for two-wheeled vehicles such as motorcycles, and more particularly to a steering system which continuously adjusts the angle of the front fork of the motorcycle.

2. Description of the Prior Art

The steering system for a motorcycle or bicycle generally consists of a shaft rotatably mountd to the front portion of the frame of the motorcycle or bicycle, which forks into left and right arms extending down to the axle of the front wheel. The handlebars are attached to the shaft such that a torque applied to them is transferred to the front wheel, thus turning the motorcycle.

Other steering systems are similarly designed, but have a shaft that is separate from, but connected to, the fork arms. This allows the attachment of a steering damper to the shaft. The shaft may have threading whereby the user may adjust the effective length of the fork arms, or the arms may themselves be telescopic. The fork may also be provided with springs or other types of shock absorbers.

As is known by one skilled in the art, the characteristics and stability of the motorcycle depend to a great extent on the pitch angle of the front fork. Moreover, it is desirous to have the capability of adjusting this pitch angle. British Pat. No. 570,439, issued to Ballamy and Sheepshanks, describes one such method of adjustment. That patent discloses a plate which may be used to adjust the relative distance between the upper portion of the shaft and the upper portion of the fork, the lower portions of each remaining fixed. Adjustment of the plate requires loosening various bolts and washers, realigning the fork with respect to the shaft, and then retightening the bolts and washers. This invention is directed to adjusting the pitch angle to suit prevailing riding conditions.

Another steering system concerned with the front fork angle is U.S. Pat. No. 3,866,946, issued to Robison. The steering head disclosed by Robison also has a shaft coupled to the fork to allow variation in the pitch angle. This is accomplished by means of eccentric bearings mounted on each end of the shaft. Adjustment of the pitch angle requires removal of the end pieces of the head tube and changing the orientation of the bearings. Only four different settings are possible.

As one skilled in the art can appreciate, each of the aforesaid devices is difficult to adjust as they require the use of special tools, and the variability of the shaft angle is limited to discrete settings. Moreover, variation of the pitch angle is additionally useful during the actual turning operation of the vehicle. The motorcycle would have increased turning ability in turns if the pitch of the front fork was closer to the vertical. This is especially critical in dirt bike racing. The above inventions only allow adjustment when the motorcycle is idle and not being used. It would therefore be desirable and advantageous to devise a variable angle steering system which continuously varies the pitch angle of the front fork of a motorcycle as the front wheel is turned.

SUMMARY OF THE INVENTION

Accordingly, the primary object of the present invention is to provide a variable angle steering system which is capable of varying the pitch angle of the front fork of a motorcycle.

Another object of the invention is to provide a variable angle steering system which requires no special tools to adjust the pitch angle of the front fork.

Still another object of the invention is to provide such a steering system that continuously varies the pitch angle as the front fork is turned.

Yet another object of the invention is to provide such a steering system which may be modified to provide different unactuated pitch angles of the front fork.

The foregoing objects are achieved in a variable angle steering system comprising an actuator assembly coupled to a pivot assembly which causes a shaft to alter its pitch angle as the motorcycle is turned, said shaft in turn affecting the pitch angle of the fron fork of the motorcycle. The device may also be used in three-wheeled, off-the-road vehicles that are popular today.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjunction with the accompanying drawings.

DESCRIPTION OF THE PREFERRED EMBODIMENTS

Figure 1:
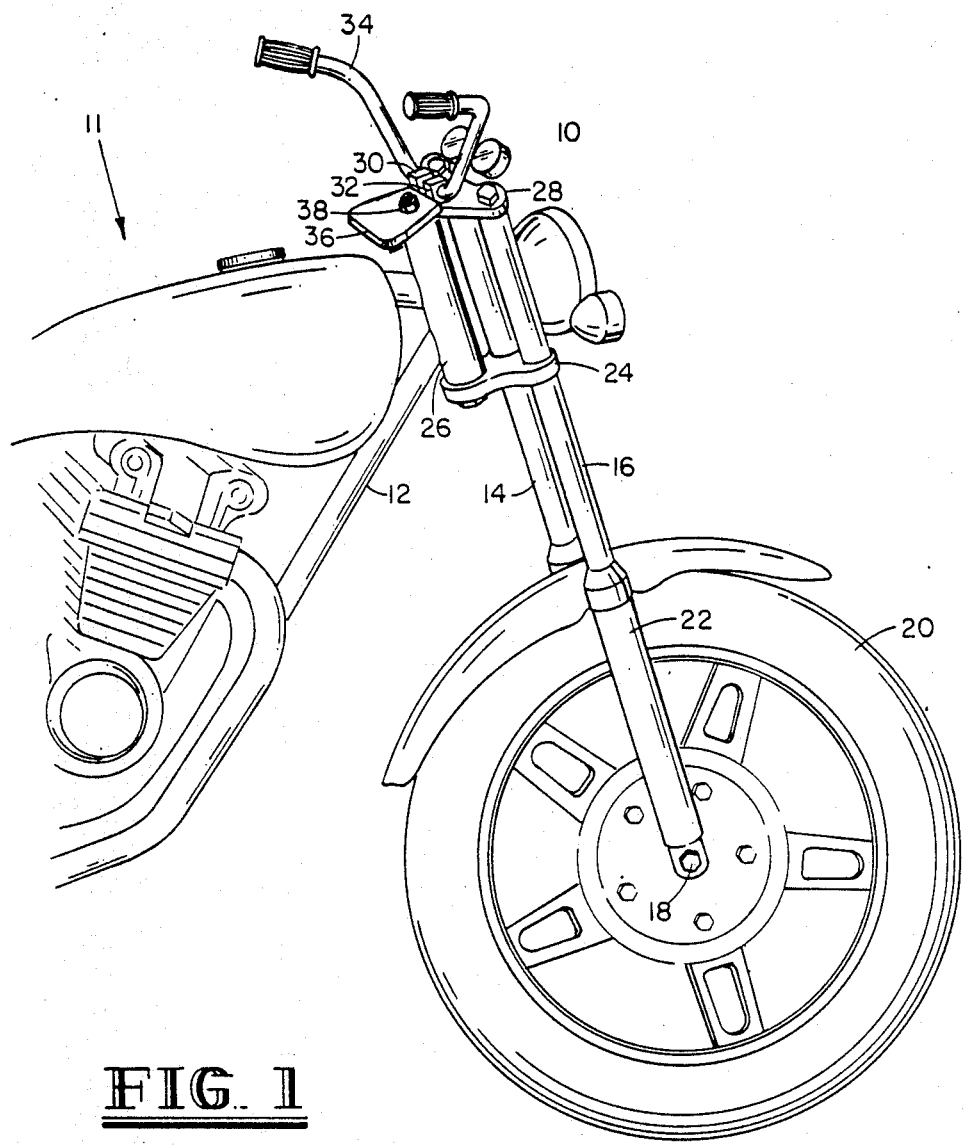
FIG. 1 is a perspective of the variable angle steering system of the present invention as mounted on a motorcycle.

With reference now to the figures, and in particular with reference to FIG. 1, there is depicted a perspective of the variable angle steering system 10 as mounted on a conventional motorcycle 11. The variable angle steering system 10 is mounted on the motorcycle frame 12, and front forks 14 and 16 extend down to the axle 18 of wheel 20. Optional shock absorbers 22 are also shown.

Figure 2:
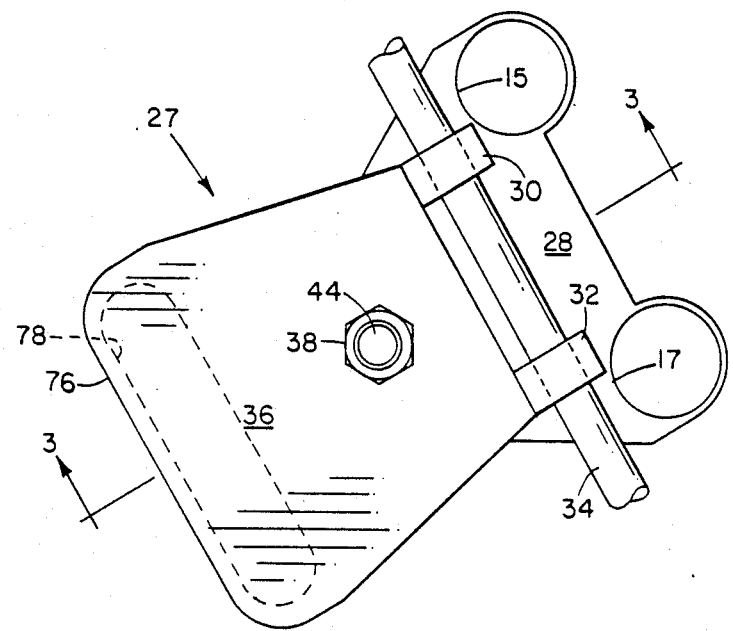
FIG. 2 is a top view of the variable angle steering system of the present invention.

As illustrated in FIG. 1, lower triple clamp 24 is attached to the intermediate portions of forks 14 and 16, and indirectly attached to head tube 26. With further reference to FIG. 2, upper triple clamp 28, which is similar in design to lower triple clamp 24, is attached to the upper portions of forks 14 and 16, the forks passing through apertures 15 and 17, respectively.

Upper triple clamp 28 also has attached thereto handlebar clamps 30 and 32 for holding handlebars 34. Top plate 36 is attached to upper triple clamp 28 by means of nut 38.

Figure 3:
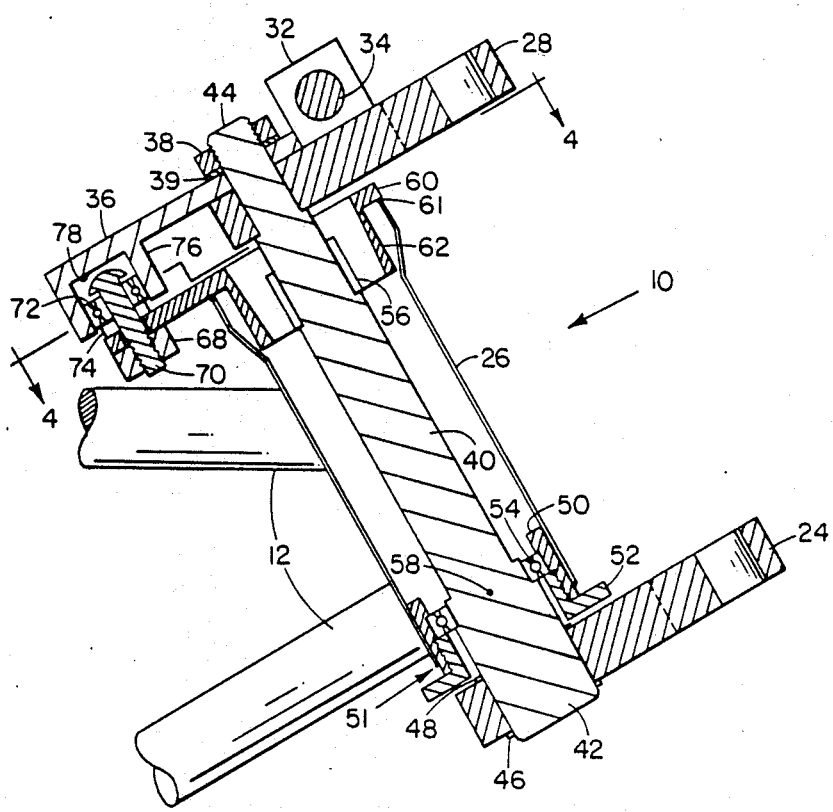
FIG. 3 is a cross-sectional view of the present invention taken along lines 3—3 of FIG. 2.

Referring now to FIG. 3, which is a cross-section taken along lines 3—3 of FIG. 2, the inner workings of the variable angle steering system are shown. Lower triple clamp 24 actually surrounds the lower portion 42 of main shaft 40, held in place by retaining clips 46 and 48. The lower portion 42 of main shaft 40 is joined to head tube 26 by means of head tube insert 50, bearing retainer 52, and self-aligning bearing 54. Head tube insert 50 may be conveniently attached to head tube 26 by weld 51. Head tube insert 50 and bearing retainer 52 together position self-aligning bearing 54 in approximately the center of head tube 26.

Figure 5:
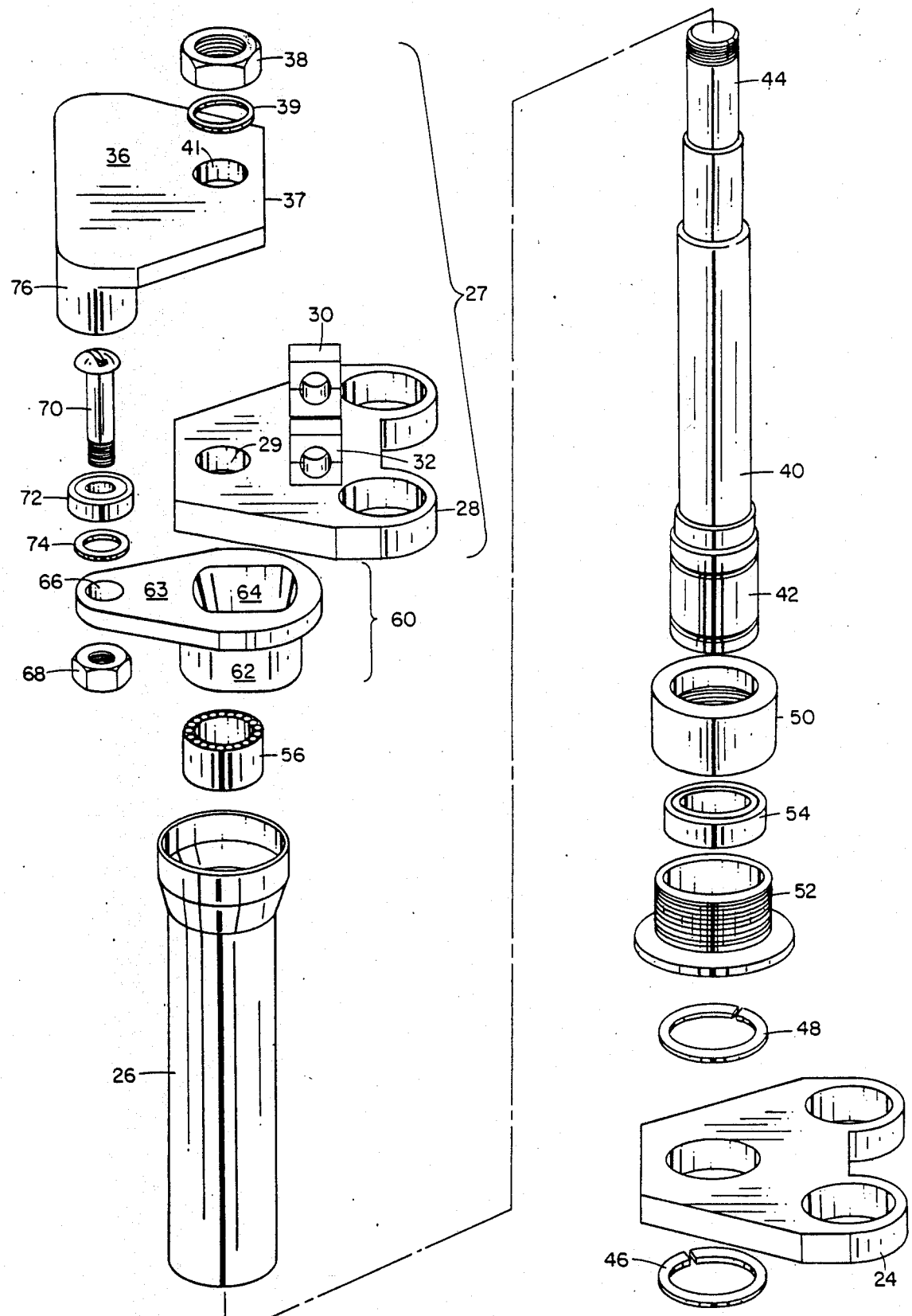
FIG. 5 is an exploded perspective of the variable angle steering system of the present invention.

The gist of the invention lies in the interaction of actuator assembly 27 (see FIG. 5) and pivot assembly 60. Pivot assembly 60 is comprised of a shaft guide 62, a plate 63 having an aperture 66, nut and bolt 68 and 70, and a self-aligning cam bearing 72. Head tube 26 is enlarged at its upper end to accommodate shaft guide 62 of pivot assembly 60. Pivot assembly 60 may be attached to head tube 26 by weld 61. A needle bearing 56 surrounds shaft 40 and abuts the inner surface of shaft guide 62. The aperture 64 of shaft guide 62 is oblong. Its width is approximately equal to the outer diameter of needle bearing 56. The distal ends of aperture 64 are preferably semi-circular, having an effective radius which is equal to the outer radius of needle bearing 56. The distal ends of aperture 64 may also be slanted to more effectively accommodate needle bearing 56 and shaft 40 when shaft 40 is pivoted about pivot point 58.

Bolt 70 passes through cam bearing 72, spacer 74, and aperture 64 in plate 63 thereby securing cam bearing 72 to pivot assembly 60. Bolt 70 is held in place by nut 68. The distance from bolt 70 to the center of shaft guide 62 is preferably between one and one-half to three and one-half inches.

After passing through pivot assembly 60, the upper portion 44 of main shaft 40 passes through actuator assembly 27. Actuator assembly 27 is comprised of upper triple clamp 28, handlebar clamps 30 and 32, and top plate 36. Aperture 29 of upper triple clamp 28 and aperture 41 of top plate 36 both snugly fit around upper portion 44 of shaft 40. The upper portion 44 of shaft 40 is held in place by nut 38 and spacer 39. The front edge 37 of top plate 36 firmly abuts handlebar clamps 30 and 32.

Figure 4:
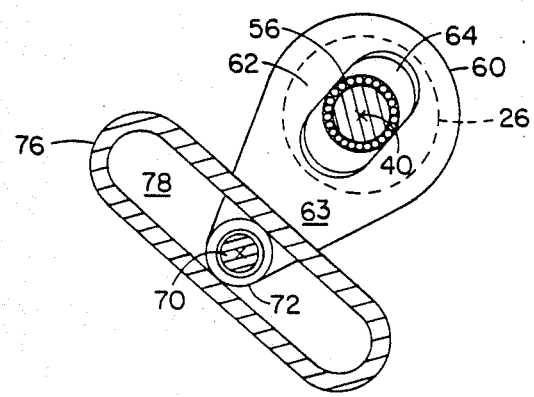
FIG. 4 is a partial cross-sectional view of the present invention taken along lines 4—4 of FIG. 3.

A cage 76 is attached to and integral with top plate 36, forming a slot 78 for cam bearing 72 (see FIGS. 3 and 4). Top plate 36 and upper triple clamp 28 could be manufactured as a single piece.

As can be seen more clearly in FIG. 4, the movement of cage 76 and top plate 36 is restricted by cam bearing 72. Because cam bearing 72 is fixed to pivot assembly 60, which is in turn fixed to head tube 26 and frame 12, cam bearing 72 is stationary with respect to the frame 12 of the motorcycle 11. Bolt 70 and cam bearing 72 may be fixed separately to frame 12 but for ease of manufacturing plate 63 preferably includes aperture 66 for containing bolt 70. A torque applied to handlebars 34 is transmitted to top plate 36 by means of handle bar clamps 30 and 32. The torque then causes top plate 36 to rotate around the upper portion 44 of main shaft 40, restricted by cam bearing 72 and slot 78 (see FIG. 4). Since the location of upper portion 44 of main shaft 40 is fixed with respect to the cage 76, as either one of the distal ends of cage 76 moves toward cam bearing 72 the upper portion 44 of main shaft 40 is displaced away from cam bearing 72.

The design of the aperture 64 in shaft guide 62 is such that the upper portion 44 of shaft 40 can only move along the longitudinal axis of the motorcycle. By means of self-aligning bearing 54, the shaft 40 is allowed to pivot about pivot point 58. The maximum angular deviation of shaft 40 about pivot point 58 is approximately 7.5°. Because the shaft 40 remains parallel to front forks 14 and 16 by means of upper and lower triple clamps 28 and 24, the pitch angle of the front forks 14 and 16 is altered by the pivoting of shaft 40. Thus the single act of the motorcyclist turning the handlebars causes the yaw angle and the pitch angle of the front forks to continuously change in a correlated manner. This provides increased maneuverability and stability of the motorcycle.

The initial setting of the shaft 40 with respect to cam bearing 72 may be altered by replacing top plate 36 with another plate in which aperture 41 is located farther away from or closer to cage 76. The function of pitch angle with respect to yaw angle may also be varied by providing cages 76 of differing curvature, yielding differently shaped cam bearing slots 78. The pivot and actuator assemblies, 60 and 27, could also be mounted on the lower portion of shaft 40, but cage 76 would be located between shaft 40 and front forks 14 and 16.

Although the invention has been described with reference to a specific embodiment, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

We claim:

1. A steering system for continuously varying pitch angle of a front fork of a vehicle having a single front wheel, comprising:
    a shaft having a first end, a second end, and an intermediate portion, said second end pivotally mounted about a pivot point on a vehicle frame by means of a self-aligning bearing, said shaft being disposed parallel to said front fork;
    a lower triple clamp integral with said front fork, having a first hole therein, said lower triple clamp being substantially perpendicular to said shaft, and said second end of said shaft passing through said first hole;
    a pivot assembly attached to and integral with said vehicle frame, said first end of said shaft passing through said pivot assembly; and
    an actuator assembly mounted on said first end of said shaft, attached to said front fork, and coupled with said pivot assembly, whereby any change in yaw of said front fork results in a corresponding change in pitch of said shaft, said changes being simultaneous and continuous for infinite variations.

2. A steering system as recited in claim 1, said pivot assembly comprising:
    a hollow shaft guide having an inner surface, said intermediate portion of said shaft passing through said shaft guide;
    a middle plate attached to and integral with said shaft guide, said middle plate being essentially perpendicular to said shaft, and having a second hole therein, said second hole being disposed diametrically opposite said front fork with respect to said shaft;
    a bolt secured in said second hole, said bolt having an upper portion and a lower portion; and
    a cam bearing surrounding said upper portion of said bolt.

3. A steering system as recited in claim 2 wherein said intermediate portion of said shaft is surrounded by a needle bearing, and the cross-sectional shape of said inner surface of said shaft guide is a rectangular having semicircular ends, wherein both the width of said rectangle and the effective diameter of said semi-circular ends are equal to the outer diameter of said needle bearing.

4. A steering system as recited in claim 3 wherein the distance from the center of said shaft guide to the center of said aperture is between one and one-half inches to three and one-half inches.

5. A steering system as recited in claim 3 wherein said inner surface at said semi-circular ends is slanted toward said pivot point of said shaft.

6. A steering system as recited in claim 2 said actuator assembly comprising:
   a top plate having a forward portion, a rear portion, a top side and an underside, said forward portion attached to said front fork, and said top plate having an aperture therein for receiving said first end of said shaft;
   means for securing said first end of said shft to said top plate;
   a generally oblong cage integral with and located at said underside of said rear portion of said top plate, said cage running essentially perpendicularly to said front fork, for slidably receiving said cam bearing;
   a handlebar member; and
   means of attaching said handlebar member to said top plate.

7. A steering system as recited in claim 6 wherein said intermediate portion of said shaft is surounded by a needle bearing, and the crosssectional shape of said inner surface of said shaft guide is a rectangular having semi-circular ends, wherein both the width of said rectangle and the effective diameter of said semi-circular ends are equal to the outer diameter of said needle bearing.

8. A steering system as recited in claim 7 wherein the distance from the center of said shaft guide to the center of said aperture is between one and one-half inches to three and one-half inches.

9. A steering system as recited in claim 7 wherein said inner surface at said semi-circular ends is slanted toward said pivot point of said shaft.

10. A steering system as recited in claim 2 said actuator assembly comprising:
    a handlebar member;
    a triple clamp attached to said front fork, having a first aperture for receiving said first end of said shaft;
    handlebar clamps integral with and attached to said triple clamp for attaching said handlebar member thereto;
    a top plate having a forward portion, a rear portion, a top side and an underside, said forward portion abutting said handlebar clamps in such a manner that a torque applied to said handlebar member results in corresponding rotation of said top plate, and said top plate also having a second aperture therein for receiving said first end of said shaft;
    means for securing said first end of said shaft to said triple clamp and said top plate; and
    a generally oblong cage integral with and located at said underside of sid rear portion of said top plate, said cage running essentially perpendicular to said front fork, for slidably receiving said cam bearing.

11. A steering system as recited in claim 10 wherein said intermediate portion of said shaft is surrounded by a needle bearing, and the crosssectional shape of said inner surface of said shaft guide is a rectangular having semi-circular ends, wherein both the width of said rectangle and the effective diameter of said semi-circular ends are equal to the outer diameter of said needle bearing.

12. A steering system as recited in claim 11 wherein the distance from the center of said shaft guide to the center of said aperture is between one and one-half inches to three and one-half inches.

13. A steering system as recited in claim 11 wherein said inner surface at said semi-circular ends is slanted toward said pivot point of said shaft.

14. A steering system as recited in claim 1, said actuator assembly comprising:
    a top plate having a forward portion, a rear portion, a top side and an underside, said forward portion attached to said front fork, and said top plate having an aperture therein for receiving said first end of said shaft;
    means for securing said first end of said shaft to said top plate;
    a generally oblong cage integral with and located at said underside of said rear portion of said top plate, said cage running essentially perpendicular to said front fork, for coupling with said pivot assembly;
    a handlebar member; and
    means of attaching said handlebar member to said top plate.

15. A steering system as recited in claim 1, said actuator assembly comprising:
    a handlebar member;
    a triple clamp attached to said front fork, having a first aperture for receiving said first end of said shaft;
    handlebar clamps integral with and attached to said triple clamp for attaching said handlebar member thereto;
    a top plate having a forward portion, a rear portion, a top side and an underside, said forward portion abutting said handlebar clamps in such a manner that a torque applied to said handlebar member results in corresponding rotating of said top plate, and said top plate also having a second aperture therein for receiving said first end of said shaft;
    means for securing said first end of said shaft to said triple clamp and said top plate; and
    a generally oblong cage integral with and located at said underside of said rear portion of said top plate, said cage running essentially perpendicular to said front fork, for coupling with said pivot assembly.

16. A steering system for continuously varying pitch angle of a front fork of a vehicle having a single front wheel, comprising:
    a frame of said vehicle having a forward portion;
    a cam bearaing attaced to said forward portion of said frame;
    a cage for slidably receiving said cam bearing, said cage coupled to said front fork;
    a shaft having a first end and a second end, said first end attached to said cage and said front fork by an upper triple clamp, and said second end pivotally mounted to said forward portion of said frame, and attached to said front fork by a lower triple clamp; and
    a shaft guide for restricting movement of said shaft along the longitudinal axis of said vehicle, whereby when said front fork is turned, the interaction of said cage and said cam bearing causes said shaft to pivot, thereby altering said pitch angle of said front fork.

17. A steering system as recited in claim 16 wherein said first end of said shaft passes through said shaft guide, said shaft being surrounded by a head tube.

18. A steering system for continuously varying pitch angle of a front fork of a vehicle having a front wheel comprising:
   upper and lower triple clamps attached to said front fork;
   a head tube attached to a frame of said vehicle;
   a shaft member with upper and lower portions, located inside of said head tube, said upper portion being attached to said upper triple clamp, and said lower portion being attached to said lower triple clamp;
   a self-aligning bearing for pivotally attaching said lower portion of said shaft member to said head tube;
   a hollow shaft guide having an oblate inner chamber for housing and restricting the movement of said upper portion of said shaft member, said shaft guide being integral with and attached to said head tube;
   a needle bearing surrounding said upper portion of said shaft member, disposed within said shaft guide;
   an arm having a distal end and a proximate end, said proximate end being attached to and integral with said shaft guide, extending away from said front fork;
   a bolt attached to said distal end of said arm having an upper portion and a lower portion, said bolt being essentially parallel to said shaft member;
   a cam bearing surrounding said upper portion of said bolt;
   a plate mounted to said upper triple clamp having a forward portion, a rear portion, a top side, and an underside, said rear underside portion of said plate having a cage for slidably receiving said cam bearing;
   a handlebar member; and
   handlebar clamps integral with said upper triple clamp for attaching said handlebar member thereto.

19. A steering system for continuously varying the pitch angle of a front fork of a vehicle having a single front wheel, comprising:
   a shaft;
   two bearing means arranged at locations spaced longitudinally along said shaft, said bearing means mounting said shaft in a frame of said vehicle for angular rotation about a generaly upright axis in the central longitudinal vertical plane of said vehicle;
   means coupling said front fork to said shaft in fixed relation thereto for rotation with said shaft, said coupling means comprising upper and lower triple clamps; and
   a third bearing means operable to vary the angular position of said axis in said vertical plane thereby to vary said pitch angle of said front fork, said variation being continuous for an infinite number of settings.

* * * * *